United States Patent
Song

(10) Patent No.: US 12,401,731 B2
(45) Date of Patent: Aug. 26, 2025

(54) USER DATA DISASTER TOLERANCE METHOD, DEVICE, NETWORK ELEMENT DEVICE AND STORAGE MEDIUM

(71) Applicants: China Mobile Communication Co., Ltd Research Institute, Beijing (CN); China Mobile Communications Group Co., Ltd., Beijing (CN)

(72) Inventor: Yue Song, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 4 days.

(21) Appl. No.: 18/556,543

(22) PCT Filed: Apr. 26, 2022

(86) PCT No.: PCT/CN2022/089197
§ 371 (c)(1),
(2) Date: Oct. 20, 2023

(87) PCT Pub. No.: WO2022/228417
PCT Pub. Date: Nov. 3, 2022

(65) Prior Publication Data
US 2024/0195893 A1 Jun. 13, 2024

(30) Foreign Application Priority Data
Apr. 26, 2021 (CN) .......................... 202110455937.8

(51) Int. Cl.
*H04L 69/40* (2022.01)
*H04L 67/02* (2022.01)

(52) U.S. Cl.
CPC .............. *H04L 69/40* (2013.01); *H04L 67/02* (2013.01)

(58) Field of Classification Search
None
See application file for complete search history.

(56) References Cited

U.S. PATENT DOCUMENTS

2017/0303065 A1* 10/2017 Li .......................... H04W 12/08
2019/0261260 A1* 8/2019 Dao ...................... H04W 48/00
(Continued)

FOREIGN PATENT DOCUMENTS

| CN | 110351111 A | 10/2019 |
| CN | 110399573 A | 11/2019 |

(Continued)

OTHER PUBLICATIONS

"3rd Generation Partnership Project; Technical Specification Group Core Network and Terminals; Study on Restoration of Profiles related to UDR (Release 17)", 3GPP TR 29.821 V0.2.0 (Mar. 2021), Jan. 12, 2021.
(Continued)

*Primary Examiner* — Phyllis A Book
(74) *Attorney, Agent, or Firm* — Price Heneveld LLP

(57) ABSTRACT

A user data disaster tolerance method, a device, a network element device and a storage medium are provided. The method includes: after the UDR network element is restarted, sending a first message to each UDM network element in a UDM network element set; where the first message is configured to notify a restart event of the UDR network element.

16 Claims, 5 Drawing Sheets

(56) References Cited

U.S. PATENT DOCUMENTS

| | | | |
|---|---|---|---|
| 2021/0029208 A1 | 1/2021 | Chen et al. | |
| 2021/0274585 A1 | 9/2021 | Yu et al. | |
| 2021/0321325 A1* | 10/2021 | Srivastava | ............ H04W 80/02 |
| 2022/0150685 A1 | 5/2022 | Chong et al. | |
| 2023/0026631 A1* | 1/2023 | He | ...................... H04L 41/0663 |
| 2023/0179669 A1* | 6/2023 | Yang | ........................ H04L 41/40 |
| | | | 709/201 |

FOREIGN PATENT DOCUMENTS

| | | | |
|---|---|---|---|
| CN | 110830422 A | 2/2020 | |
| CN | 111200848 A | 5/2020 | |
| CN | 112312418 A | 2/2021 | |
| CN | 112584369 A | 3/2021 | |
| CN | 112637819 A | 4/2021 | |
| EP | 3729841 B1 * | 11/2021 | ............. H04L 41/06 |
| WO | 2020225296 A1 | 11/2020 | |
| WO | WO-2022151367 A1 * | 7/2022 | |

OTHER PUBLICATIONS

"3rd Generation Partnership Project; Technical Specification Group Core Network and Terminals; 5G System; Unified Data Repository Services; Stage 3 (Release 17)", 3GPP TR 29.504 V17.2.0 (Mar. 2021), Jan. 30, 2021.

"3rd Generation Partnership Project; Technical Specification Group Core Network and Terminals; 5G System; Unified Data Management Services; Stage 3 (Release 17)", 3GPP TR 29.503 V17.2.0 (Mar. 2021), Jan. 30, 2021.

3rd Generation Partnership Project, "Technical Specification Group Core Network and Terminals", 3GPP TR 29.821, V0.2.0, Mar. 2021.

Huawei, "Discussion on Subscription to notifications Notifications for Nudr", 3GPP TSG CT4 Meeting #84, C4-183220, Apr. 16-20, 2018, KunMing, P.R. China.

Ericsson, "UDR Subscriptions", 3GPP TSG-CT WG4 Meeting #89, C4-190172, Feb. 25-Mar. 1, Montreal, Canada.

* cited by examiner

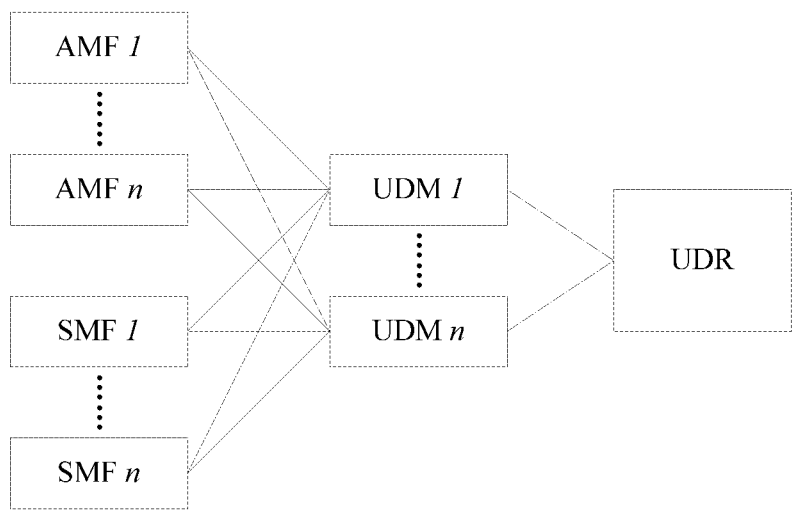
FIG.1
after the UDR network element is restarted, sending a first message to each UDM network element in a UDM network element se
/ 201
FIG.2
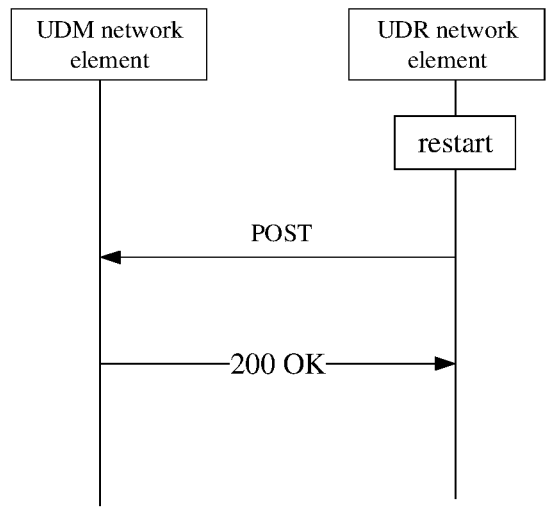
FIG.3

USER DATA DISASTER TOLERANCE METHOD, DEVICE, NETWORK ELEMENT DEVICE AND STORAGE MEDIUM

CROSS REFERENCE OF RELATED APPLICATION

The present disclosure is the U.S. national phase of PCT Application PCT/CN2022/089197 filed on Apr. 26, 2022, which claims a priority of Chinese patent disclosure No. 202110455937.8 filed on Apr. 26, 2021, which is incorporated herein by reference in its entirety.

TECHNICAL FIELD

The present disclosure relates to the field of communication technology, and in particular to a user data disaster tolerance method, a device, a network element device and a storage medium.

BACKGROUND

During the operation of the $5^{th}$ Generation (5G) network, the Unified Data Repository (UDR) network element in the 5G core network needs to maintain synchronization of user temporary data in related network elements. In the related art, the Unified Data Management (UDM) network elements cannot know the faults, crash and other conditions of UDR network elements in real time, which further leads to untimely data synchronization of UDR network elements.

SUMMARY

In order to solve related technical issues, the embodiments of the present disclosure provide a user data disaster tolerance method, a device, a network element device and a storage medium.

The technical solution of the embodiment of the present disclosure is implemented as follows:

A user data disaster tolerance method is provided in an embodiment of the present disclosure, applied to a Unified Data Repository (UDR) network element, including:
  after the UDR network element is restarted, sending a first message to each Unified Data Management (UDM) network element in a UDM network element set; where,
  the first message is configured to notify a restart event of the UDR network element.

A user data disaster tolerance method is further provided in an embodiment of the present disclosure, applied to a Unified Data Repository (UDR) network element, including:
  receiving a first message sent by the UDR network element; where,
  the first message is configured to notify a restart event of the UDR network element.

A user data disaster tolerance device is further provided in an embodiment of the present disclosure, including:
  a first sending unit, configured to send, after a UDR network element is restarted, a first message to each Unified Data Management (UDM) network element in a UDM network element set; where,
  the first message is configured to notify a restart event of the UDR network element.

A user data disaster tolerance device is further provided in an embodiment of the present disclosure, including:
  a first receiving unit, configured to receive a first message sent by a Unified Data Repository (UDR) network element; where,
  the first message is configured to notify a restart event of the UDR network element.

A Unified Data Repository (UDR) network element is further provided in an embodiment of the present disclosure, including: a first processor and a first communication interface; where,
  the first communication interface is configured to send, after the UDR network element is restarted, a first message to each Unified Data Management (UDM) network element in a UDM network element set; the first message is configured to notify a restart event of the UDR network element.

A Unified Data Management (UDM) network element is further provided in an embodiment of the present disclosure, including: a second processor and a second communication interface; where,
  the second communication interface is configured to receive a first message sent by a Unified Data Repository (UDR) network element; the first message is configured to notify a restart event of the UDR network element.

A Unified Data Repository (UDR) network element is further provided in an embodiment of the present disclosure, including: a first processor and a first memory configured to store a computer program executable on the processor,
  where the first processor is configured to execute the computer program to perform the method at the UDR network element side.

A Unified Data Management (UDM) network element is further provided in an embodiment of the present disclosure, including: a second processor and a second memory configured to store a computer program executable on the processor,
  where the second processor is configured to execute the computer program to perform the method at the UDM network element side.

A storage medium is further provided in an embodiment of the present disclosure, where a computer program is stored in the storage medium, the computer program is executed by a processor to perform the method at the UDR network element side or the method at the UDM network element side.

According to the a user data disaster tolerance method, a device, a network element device and a storage medium in the embodiments of the present disclosure, after the UDR network element is restarted, a first message is sent to each UDM network element in a UDM network element set, to notify the UDM network element of a restart event of the UDR network element. Therefore, when the UDR network element is restarted due to failure, crash, etc., the UDM network element may promptly learn that the UDR network element is restarted. On this basis, a data synchronization process between the UDR network element and the related network element may be triggered as soon as possible, thereby ensuring the disaster tolerance of user data equipment in the 5G core network.

BRIEF DESCRIPTION OF THE DRAWINGS

FIG. 1 is a network architecture diagram related to 5G user data in related art;

FIG. 2 is a schematic flow chart of a user data disaster tolerance method in an embodiment of the present disclosure;

FIG. 3 is a schematic diagram of the implementation process of sending a first message from a UDR network element to a UDM network element in an embodiment of the present disclosure;

DETAILED DESCRIPTION

Figure 4:
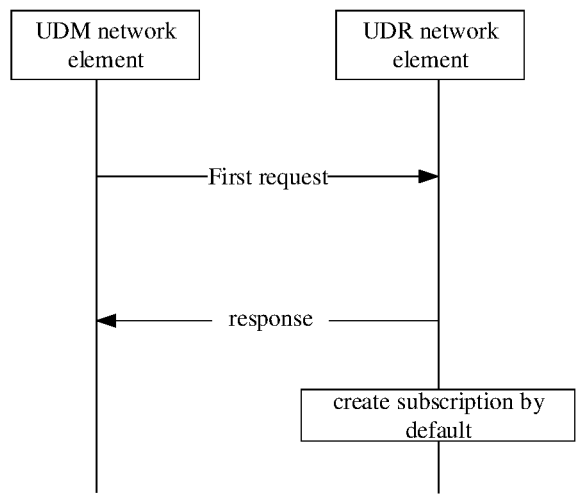
FIG. 4 is a schematic diagram of the implementation process of creating a subscription in an implicit manner in an embodiment of the present disclosure.

The user data equipment of the 5G core network is used to store relevant persistent data and temporary data of 5G users. The persistent data includes: user mobility management subscription data, session management subscription data, policy data, etc. Usually, user data equipment includes two equipment forms: UDM network element and UDR network element. UDR network element is used to actually store the relevant persistent data and temporary data of 5G users, which is equivalent to the backend database; UDM network element is the core of 5G Other interfaces in the network that access user data implement business logic related to user data access, which is equivalent to the front-end access interface. FIG. 1 shows the network architecture related to 5G user data in related technologies.

During the operation of the 5G network, UDR network elements will inevitably experience failures, downtime, etc. In actual application, the UDR network element usually backs up the stored data to the backup database regularly. When the UDR network element fails and is restarted, the data can be restored from the backup database. However, during the restart and data recovery process of the UDR network element, if the user's temporary data, such as the temporary mobility management data in the AMF network element, changes, the problem of data inconsistency between the AMF network element and the UDR network element will occur. Therefore, after a UDR network element fails and is restarted, relevant network elements need to be notified to trigger the data resynchronization process. However, in related art, since UDM network elements cannot know the faults, downtime and other conditions of UDR network elements in real time, this further leads to untimely data synchronization of UDR network elements and disaster tolerance of user data equipment in the 5G core network is not good.

According to the a user data disaster tolerance method, a device, a network element device and a storage medium in the embodiments of the present disclosure, after the UDR network element is restarted, a first message is sent to each UDM network element in a UDM network element set, to notify the UDM network element of a restart event of the UDR network element. Therefore, when the UDR network element is restarted due to failure, crash, etc., the UDM network element may promptly learn that the UDR network element is restarted. On this basis, a data synchronization process between the UDR network element and the related network element may be triggered as soon as possible, thereby ensuring the disaster tolerance of user data equipment in the 5G core network.

The present disclosure will be described in further detail below in conjunction with the drawings and embodiments.

A user data disaster tolerance method, applied to a Unified Data Repository (UDR) network element is provided in an embodiment of the present disclosure, As shown in FIG. 2, the method includes:

Step 201: after the UDR network element is restarted, sending a first message to each UDM network element in a UDM network element set.

The first message is configured to notify a restart event of the UDR network element.

In actual application, after a UDR network element fails and is restarted, the UDR network element can use the notification process defined in the 5G service-oriented interface protocol framework to send the first message to the relevant UDM network element, to notify the UDM network element that a restart event has occurred in the UDR network element. Here, the UDR network element sends the first message to each UDM network element in the UDM network element set, where the UDM network element set includes one or more UDM network elements.

FIG. 3 is a schematic diagram of the implementation process of sending a first message from a UDR network element to a UDM network element. After the UDR network element is restarted, the UDR network element sends a POST message to the UDM network element, to notify the UDM network element that a restart event has occurred on the UDR network element. After receiving the POST message, the UDM network element returns a 200 OK message to the UDR network element.

In one embodiment, the first message carries at least one of the following:

a restart time of the UDR network element;

an impacted number range.

In one embodiment, the first message is a POST message.

In actual application, the UDR network element creates a subscription for the UDR network element restart event for one or more UDM network elements. These UDM network elements which have subscribed to the restart event are classified into the UDM network element set. In this way, after the UDR network element is restarted, the UDM network element may send the first message to the UDM network element that has subscribed to the UDR network element restart event.

Based on this, in one embodiment, prior to the sending the first message to each UDM network element in the UDM network element set, the method further includes:

creating first subscription information for the UDM network element; where, the first subscription information represents that the corresponding UDM network element subscribes to the restart event of the UDR network element.

In an embodiment, the first subscription information at least includes an identification of the corresponding UDM network element.

Here, in addition to representing the UDM network element subscribes to the restart event of the UDR network element, the first subscription information created here can also include the identification of the corresponding UDM network element, which is used to mark the UDM network element that has subscribed to the restart event. In this way, when the UDR network element restarts, it can send the first message to the relevant UDM network element that has subscribed to the restart event based on the identifier of the UDM network element.

In actual application, the creation of the first subscription information can be completed implicitly or explicitly. Based on this, in one embodiment, when creating the first subscription information for the UDM network element, the method includes:
creating the first subscription information for the corresponding UDM network element based on a received first request or second request; where,
the first request represents an access request for the UDR network element; the second request represents a subscription request for the restart event of the UDR network element.

Here, corresponding to the way of implicitly creating the first subscription information, referring to the example in FIG. 4, the UDM network element initiates the first request to the UDR network element, requests accessing the data in the UDR network element. The UDR network element receives the first request and then sends back a response to the first request to the UDM network element. Then, it is considered by default that the first subscription information is created for the UDM network element. In this way, the UDM network element completes the subscription of restart event of the UDR network element.

Figure 5:
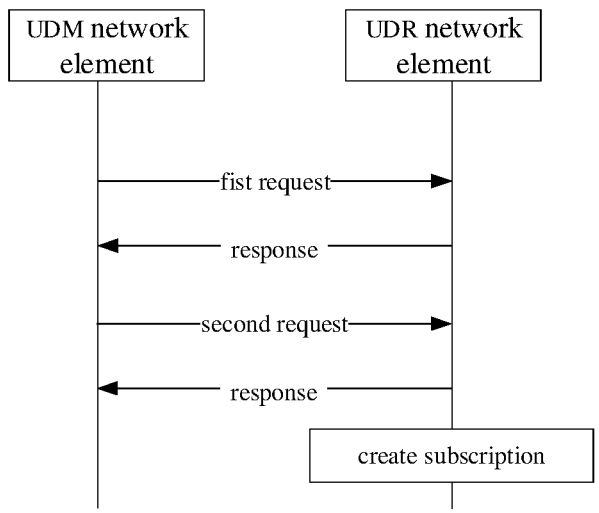
FIG. 5 is a schematic diagram of the implementation process of creating a subscription in an explicit manner in an embodiment of the present disclosure.

Corresponding to the way of explicitly creating the first subscription information, referring to the example of FIG. 5, after the UDM network element initiates the first request to the UDR network element, and the UDM network element receives the response to the first request returned by the UDR network element, the UDM network element initiates a second request to the UDR network element, to request subscribing to the restart event of the UDR network element. After receiving the second request, the UDR network element returns a response to the second request to the UDM network element. Then, it is considered by default that the first subscription information is created for the UDM network element. In this way, the UDM network element completes the subscription of restart event of the UDR network element.

Considering that when the UDR network element restarts after a fault, crash, etc., the information stored on the UDR network element will be lost, then the first subscription information created for the UDM network element will also be lost. Therefore, in order to ensure that the UDR network element after being restarted can still correctly and timely send notification messages to the UDM network element. In one embodiment, the method further includes:
backing up the first subscription information corresponding to the UDM network element.

Here, the UDR network element can regularly back up user data to the backup database and at the same time back up the first subscription information to the backup database.

In this way, when the UDR network element fails and being restarted, it can recover the user data and first subscription information from the backup database, thereby ensuring that notifications can be correctly and timely sent to UDM network elements that have subscribed to restart events, after encountering a subsequent failure, crash, etc. and being restarted.

In actual application, the UDR network element sends the first message to the UDM network element based on the URI configured to receive the notification message in the UDM network element. Therefore, before sending the first message, the UDR network element needs to obtain the URI configured to receive the notification message in the UDM network element. Based on this, in one embodiment, the method further includes:
obtaining a Uniform Resource Identifier (URI) configured to receive a notification message in the UDM network element, by querying a Network Repository Function (NRF) network element; and/or,
obtaining a URI configured to receive a notification message in the UDM network element from the first request or the second request of the UDM network element.

Here, corresponding to the above situation of explicitly subscribing to the restart event, when the UDM network element sends the second request for subscribing to the restart event to the UDR network element, the URI configured to receive the notification message in the UDM network element is carried in the second request. In this way, the UDR network element can obtain the corresponding URI from the received second request.

Corresponding to the above situation of implicitly subscribing to restart events, the UDR network element can obtain the URI configured to receive notification messages in the UDM network element based on at least one of the following methods:
1. The UDR network element queries the NRF network element to obtain the URI configured to receive notification messages in the corresponding UDM network element;
2. When the UDM network element initiates the first request for data access to the UDR network element, it adds in the first request the URI configured to receive the notification message in the UDM network element. In this way, the UDR network element may obtain the corresponding URI from the received first request.

In an embodiment, after sending the first message to each UDM network element in the UDM network element set, the method further includes:
performing a data synchronization with an Access and Mobility Management Function (AMF) network element and/or a Session Management Function (SMF) network element.

Figure 6:
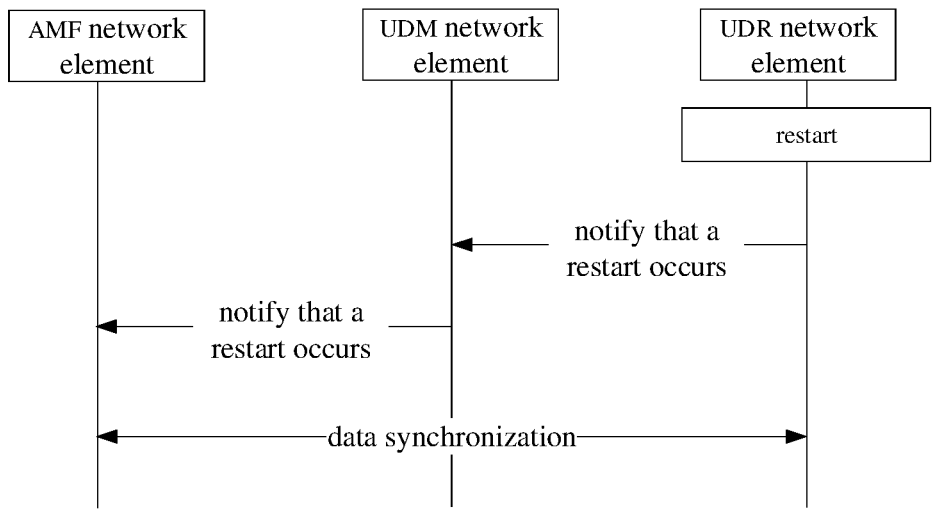
FIG. 6 is a schematic diagram of a data synchronization triggering process in an embodiment of the present disclosure.

Referring to the example in FIG. 6, after restarting, the UDR network element notifies the UDM network element of the corresponding restart event through the first message. The UDM network element then notifies the corresponding AMF and/or SMF network element of the corresponding restart event based on the first message. After that, the corresponding data synchronization process is triggered, and the data synchronization process is started before the AMF and/or SMF network element and the UDR network element.

Figure 7:
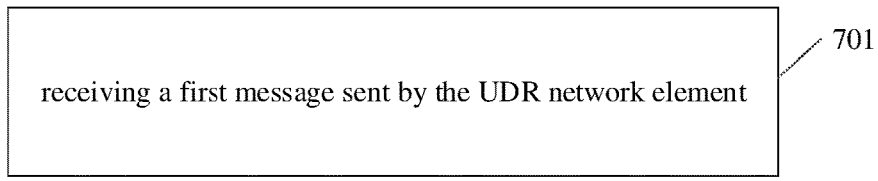
FIG. 7 is a schematic flow chart of a user data disaster tolerance method in another embodiment of the present disclosure.

Correspondingly, the embodiment of the present disclosure also provides a data disaster tolerance method, which is applied to UDM network elements. As shown in FIG. 7, the method includes:

Step 701: receiving a first message sent by the UDR network element; where, the first message is configured to notify a restart event of the UDR network element.

Here, the first message is sent to the UDM network element after the UDR network element is restarted. In actual application, after the UDR network element fails and is restarted, the UDR network element may use the notification process defined in the 5G service-oriented interface protocol framework to send the first message to the relevant UDM network element, to notify the UDM network element that a restart event has occurred in the UDR network element.

In one embodiment, the first message carries at least one of the following:

a restart time of the UDR network element;

an impacted number range.

In one embodiment, the first message is a POST message.

In an embodiment, prior to the receiving the first message sent by the UDR network element, the method further includes:

sending a first request to the UDR network element; where, the first request represents an access request for the UDR network element.

In one embodiment, the first request carries a Uniform Resource Identifier (URI) configured to receive a notification message in the UDM network element.

Here, corresponding to the way of implicitly creating the first subscription information, referring to the example in FIG. 4, the UDM network element initiates the first request to the UDR network element, requests accessing the data in the UDR network element. The UDR network element receives the first request and then sends back a response to the first request to the UDM network element. Then, it is considered by default that the first subscription information is created for the UDM network element. In this way, the UDM network element completes the subscription of restart event of the UDR network element.

Corresponding to the above situation of implicitly subscribing to restart events, the UDR network element can obtain the URI configured to receive notification messages in the UDM network element based on at least one of the following methods:

1. The UDR network element queries the NRF network element to obtain the URI configured to receive notification messages in the corresponding UDM network element;
2. When the UDM network element initiates the first request for data access to the UDR network element, it adds in the first request the URI configured to receive the notification message in the UDM network element. In this way, the UDR network element may obtain the corresponding URI from the received first request.

In an embodiment, subsequent to the sending the first request to the UDR network element, the method further includes:

sending a second request to the UDR network element; where, the second request represents a subscription request for the restart event of the UDR network element.

In an embodiment, the second request carries a URI configured to receive a notification message in the UDM network element.

Corresponding to the way of explicitly creating the first subscription information, referring to the example of FIG. 5, after the UDM network element initiates the first request to the UDR network element, and the UDM network element receives the response to the first request returned by the UDR network element, the UDM network element initiates a second request to the UDR network element, to request subscribing to the restart event of the UDR network element. After receiving the second request, the UDR network element returns a response to the second request to the UDM network element. Then, it is considered by default that the first subscription information is created for the UDM network element. In this way, the UDM network element completes the subscription of restart event of the UDR network element.

Here, corresponding to the above situation of explicitly subscribing to the restart event, when the UDM network element sends the second request for subscribing to the restart event to the UDR network element, the URI configured to receive the notification message in the UDM network element is carried in the second request. In this way, the UDR network element can obtain the corresponding URI from the received second request.

In an embodiment, subsequent to the receiving the first message sent by the UDR network element, the method further includes:

sending the first message to an Access and Mobility Management Function (AMF) network element and/or a Session Management Function (SMF) network element.

Referring to the example in FIG. 6, after restarting, the UDR network element notifies the UDM network element of the corresponding restart event through the first message. The UDM network element then notifies the corresponding AMF and/or SMF network element of the corresponding restart event based on the first message. After that, the corresponding data synchronization process is triggered, and the data synchronization process is started before the AMF and/or SMF network element and the UDR network element.

Figure 8:
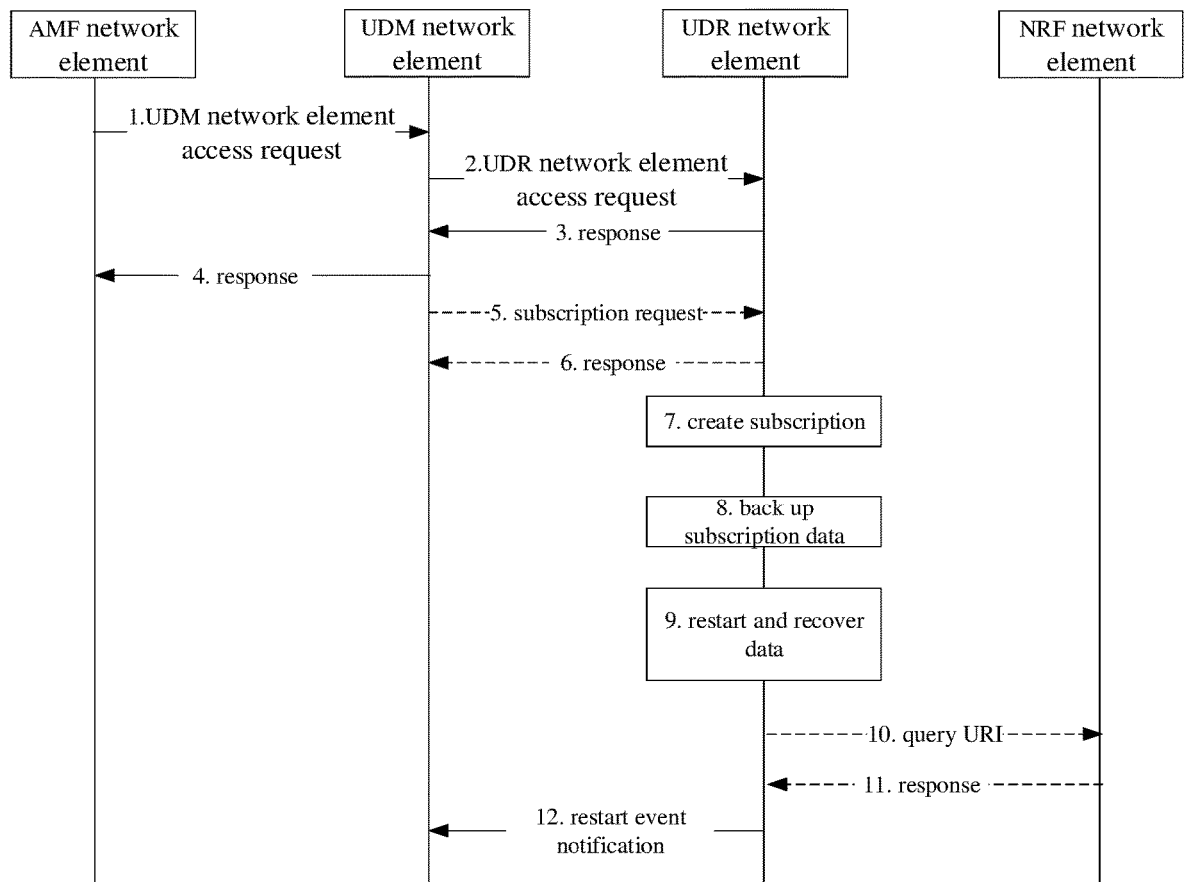
FIG. 8 is a schematic flow chart of a network structure and IPv6 asset automatic discovery method in an embodiment of the present disclosure.

FIG. 8 shows the implementation process of the user data disaster tolerance method provided by the application embodiment of the present disclosure, which includes the following steps:

Step 1: AMF network element sends a UDM network element access request to the UDM network element.

Step 2: UDM network element sends a UDR network element access request to the UDR network element.

In steps 1 and 2, it is equivalent to that the AMF network element initiates a service request to the UDM network element, and the UDM network element correspondingly initiates a service request to the UDR network element. Optionally, in step 2, the UDM network element may add a URI for receiving the notification message in the request.

Step 3: UDR network element returns a response to the UDR network element access request to the UDM network element.

Step 4: UDM network element returns a response to the UDM network element access request to the AMF network element.

Here, the UDM network element serves as the access interface between the AMF network element and the UDR network element to implement relevant business logic.

Optionally, Step 5: UDM network element sends a restart event subscription request to the UDR network element.

Optionally, in Step 5, UDM network element may carry the URI configured to receive the notification message in the request.

Based on Step 5, Step 6: UDR network element returns a response to the restart event subscription request to the UDM network element.

Step 7: UDR network element creates a subscription for the restart event for the UDM network element.

Here, if steps 5 and 6 are performed, the UDR network element creates the subscription based on the explicit method. If steps 5 and 6 are not performed, the UDR network element creates the subscription based on the implicit method.

Step 8: UDR network element backs up the subscription data generated in step 7.

Here, the UDR network element backs up local user data and subscription data at the same time.

Step 9: UDR network element fails and restarts to recover data.

Here, the recovered data includes user data and subscription data.

Optionally, step 10: UDR network element queries the NRF network element for the URI configured to receive the notification message in the UDM network element.

Here, if the UDR network element obtains the corresponding URI from the request sent by the UDM network element in step 2 or step 5, then step 10 does not need to be performed.

Based on step 10, Step 11: NRF network element returns a response about the query result to the UDR network element.

Step 12: UDR network element sends the first message to the UDM network element to notify the UDM network element that the UDR network element has restarted.

According to the a user data disaster tolerance method, a device, a network element device and a storage medium in the embodiments of the present disclosure, after the UDR network element is restarted, a first message is sent to each UDM network element in a UDM network element set, to notify the UDM network element of a restart event of the UDR network element. Therefore, when the UDR network element is restarted due to failure, crash, etc., the UDM network element may promptly learn that the UDR network element is restarted. On this basis, a data synchronization process between the UDR network element and the related network element may be triggered as soon as possible, thereby ensuring the disaster tolerance of user data equipment in the 5G core network, and can support the disaster tolerance of UDR network elements when UDM network elements and UDR network elements from different manufacturers are networked.

Figure 9:
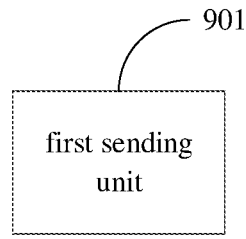
FIG. 9 is a schematic structural diagram of a user data disaster tolerance device in an embodiment of the present disclosure.

In order to implement the method on the UDR network element side of the embodiment of the present disclosure, the embodiment of the present disclosure also provides a user data disaster tolerance device, which is provided in the UDR network element. As shown in FIG. 9, the device includes:

a first sending unit 901, configured to send, after a UDR network element is restarted, a first message to each Unified Data Management (UDM) network element in a UDM network element set; where,
the first message is configured to notify a restart event of the UDR network element.

In an embodiment, the first message carries at least one of:
a restart time of the UDR network element;
an impacted number range.

In an embodiment, the first message is a POST message.

In an embodiment, the device further includes:
a subscribing unit, configured to, prior to sending the first message to each UDM network element in the UDM network element set, create first subscription information for the UDM network element; where,
the first subscription information represents that the corresponding UDM network element subscribes to the restart event of the UDR network element.

In an embodiment, the first subscription information at least includes an identification of the corresponding UDM network element.

In an embodiment, the subscribing unit is configured to:
create the first subscription information for the corresponding UDM network element based on a received first request or second request; where,
the first request represents an access request for the UDR network element; the second request represents a subscription request for the restart event of the UDR network element.

In an embodiment, the subscribing unit is further configured to:
obtain a Uniform Resource Identifier (URI) configured to receive a notification message in the UDM network element, by querying a Network Repository Function (NRF) network element; and/or,
obtain a URI configured to receive a notification message in the UDM network element from the first request or the second request of the UDM network element.

In an embodiment, the device further includes:
a backing-up unit, configured to back up the first subscription information corresponding to the UDM network element.

In an embodiment, the device further includes:
a data synchronization unit, configured to perform a data synchronization with an Access and Mobility Management Function (AMF) network element and/or a Session Management Function (SMF) network element.

In actual application, the first sending unit 901 and the data synchronization unit can be implemented by the communication interface in the user data disaster tolerance device; the subscription unit and the backing-up unit can be implemented by the processor in the user data disaster tolerance device.

Figure 10:
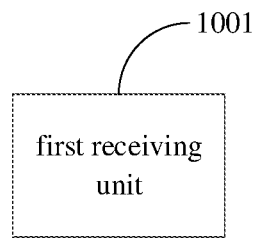
FIG. 10 is a schematic structural diagram of another user data disaster tolerance device in an embodiment of the present disclosure.

In order to implement the method on the UDM network element side of the embodiment of the present disclosure, the embodiment of the present disclosure also provides a user data disaster tolerance device, which is provided in the UDM network element. As shown in FIG. 10, the device includes:

a first receiving unit, configured to receive a first message sent by a Unified Data Repository (UDR) network element; where,
the first message is configured to notify a restart event of the UDR network element.

In an embodiment, the first message carries at least one of the following:
a restart time of the UDR network element;
an impacted number range.

In an embodiment, the first message is a POST message.

In an embodiment, the device further includes:
a second sending unit, configured to, prior to the receiving the first message sent by the UDR network element, send a first request to the UDR network element; where,
the first request represents an access request for the UDR network element.

In an embodiment, the first request carries a Uniform Resource Identifier (URI) configured to receive a notification message in the UDM network element.

In an embodiment, the device further includes:

a third sending unit, configured to, subsequent to sending the first request to the UDR network element, send a second request to the UDR network element; where, the second request represents a subscription request for the restart event of the UDR network element.

In an embodiment, the second request carries a URI configured to receive a notification message in the UDM network element.

In an embodiment, the device further includes:

a fourth sending unit, configured to, subsequent to receiving the first message sent by the UDR network element, send the first message to an Access and Mobility Management Function (AMF) network element and/or a Session Management Function (SMF) network element.

In actual application, the first receiving unit 1001, the second sending unit, the third sending unit and the fourth sending unit may be implemented by the communication interface in the user data disaster tolerance device.

It should be noted that when the user data disaster tolerance device provided in the above embodiment performs user data disaster tolerance, only the division of the above program modules is used as an example. In actual applications, the above processing can be allocated to different modules as needed. The program module is completed, that is, the internal structure of the device is divided into different program modules to complete all or part of the processing described above. In addition, the user data disaster tolerance device provided by the above embodiments and the user data disaster tolerance method embodiments belong to the same concept, which may refer to the method embodiments for the specific implementation process, which will not be described again here.

Figure 11:
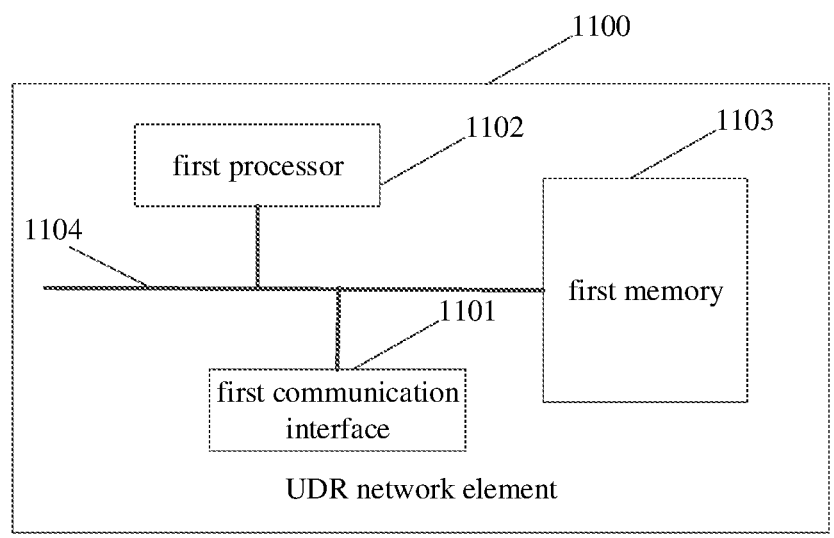
FIG. 11 is a schematic structural diagram of a UDR network element in an embodiment of the present disclosure.

Based on the hardware implementation of the above program module, and in order to implement the method on the UDR network element side of the embodiment of the present disclosure, the embodiment of the present disclosure also provides a UDR network element. As shown in FIG. 11, the UDR network element 1100 includes:

a first communication interface 1101, is capable of exchanging information with other network nodes;

a first processor 1102, connected to the first communication interface 1101 to implement information interaction with other network nodes, and is configured to perform the method provided by one or more embodiments on the UDR network element side when running a computer program. The computer program is stored on the first memory 1103.

Specifically, the first communication interface 1101 is configured to send a first message to each UDM network element in the UDM network element set after the UDR network element is restarted; where the first message is configured to notify a restart event of the UDR network element.

In an embodiment, the first message carries at least one of:

a restart time of the UDR network element;

an impacted number range.

In an embodiment, the first message is a POST message.

In an embodiment, the first processor 1102 is configured to, prior to sending the first message to each UDM network element in the UDM network element set, create first subscription information for the UDM network element; where, the first subscription information represents that the corresponding UDM network element subscribes to the restart event of the UDR network element.

In an embodiment, the first subscription information at least includes an identification of the corresponding UDM network element.

In an embodiment, the first processor 1102 is configured to:

create the first subscription information for the corresponding UDM network element based on a received first request or second request; where, the first request represents an access request for the UDR network element; the second request represents a subscription request for the restart event of the UDR network element.

In an embodiment, the first processor 1102 is further configured to:

obtain a Uniform Resource Identifier (URI) configured to receive a notification message in the UDM network element, by querying a Network Repository Function (NRF) network element; and/or, obtain a URI configured to receive a notification message in the UDM network element from the first request or the second request of the UDM network element.

In an embodiment, the first processor 1102 is further configured to back up the first subscription information corresponding to the UDM network element.

In an embodiment, the first communication interface 1101 is configured to, subsequent to the receiving the first message sent by the UDR network element, perform a data synchronization with an Access and Mobility Management Function (AMF) network element and/or a Session Management Function (SMF) network element.

It should be noted that the specific processing procedures of the first processor 1102 and the first communication interface 1101 can be understood with reference to the above method.

Of course, in actual application, various components in the UDR network element 1100 are coupled together through the bus system 1104. It will be appreciated that the bus system 1104 is configured to enable connected communications between these components. In addition to the data bus, the bus system 1104 also includes a power bus, a control bus and a status signal bus. However, for the sake of clarity, the various buses are labeled bus system 1104 in FIG. 11.

The first memory 1103 in the embodiment of the present disclosure is configured to store various types of data to support the operation of the UDR network element 1100. Examples of such data include: any computer program configured to operate on UDR network element 1100.

The methods disclosed in the above embodiments of the present disclosure can be applied to the first processor 1102 or implemented by the first processor 1102. The first processor 1102 may be an integrated circuit chip with signal processing capabilities. During the implementation process, each step of the above method can be completed by instructions in the form of hardware integrated logic circuits or software in the first processor 1102. The above-mentioned first processor 1102 may be a general-purpose processor, a digital signal processor (DSP), or other programmable logic devices, discrete gate or transistor logic devices, discrete hardware components, etc. The first processor 1102 can implement or execute the various methods, steps and logical block diagrams disclosed in the embodiments of the present disclosure. A general-purpose processor may be a microprocessor or any conventional processor, etc. The steps of the method disclosed in the embodiments of the present disclosure can be directly implemented by a hardware decoding processor, or executed by a combination of hardware and software modules in the decoding processor. The software module may be located in a storage medium, and the storage medium is located in the first memory 1103. The first processor 1102 reads the information in the first memory 1103, and completes the steps of the foregoing method in combination with its hardware.

In an exemplary embodiment, the UDR network element 1100 may be configured by one or more Application Specific Integrated Circuits (ASICs), DSPs, Programmable Logic Devices (PLDs), Complex Programmable Logic Devices (CPLD), Field-Programmable Gate Array (FPGA), general-purpose processor, controller, Micro Controller Unit (MCU), Microprocessor), or others Electronic components are implemented for performing the aforementioned methods.

Figure 12:
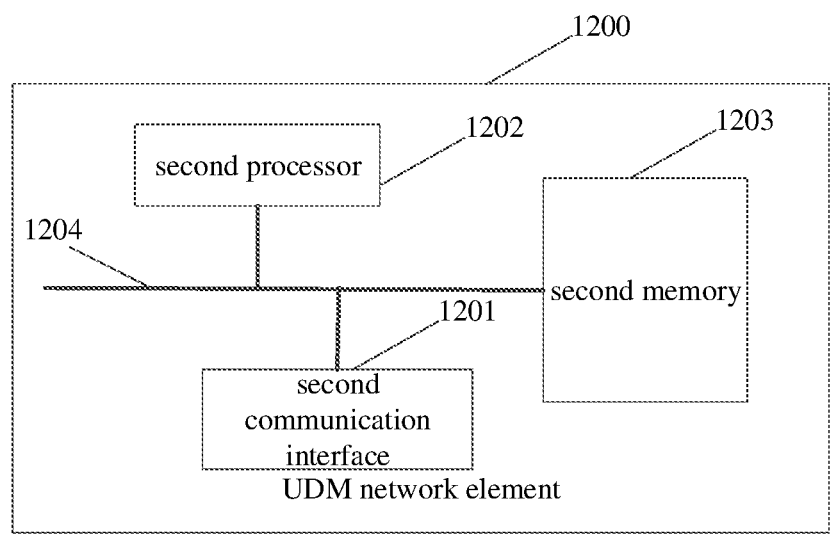
FIG. 12 is a schematic structural diagram of a URM network element in an embodiment of the present disclosure.

Based on the hardware implementation of the above program module, and in order to implement the method on the UDM network element side of the embodiment of the present disclosure, the embodiment of the present disclosure also provides a UDM network element. As shown in FIG. 12, the UDM network element 1200 includes:

- a second communication interface 1201, capable of exchanging information with other network nodes;
- a second processor 1202, connected to the second communication interface 1201 to implement information interaction with other network nodes, and is configured to execute the method provided by one or more embodiments on the UDM network element side when running a computer program. The computer program is stored on the second memory 1203.

Specifically, the second communication interface 1201 is configured to:

receive a first message sent by a Unified Data Repository (UDR) network element; where, the first message is configured to notify a restart event of the UDR network element.

In an embodiment, the first message carries at least one of the following:

a restart time of the UDR network element;

an impacted number range.

In one embodiment, the first message is a POST message.

In one embodiment, the second communication interface 1201 is further configured to:

prior to the receiving the first message sent by the UDR network element, send a first request to the UDR network element; where, the first request represents an access request for the UDR network element.

In an embodiment, the first request carries a Uniform Resource Identifier (URI) configured to receive a notification message in the UDM network element.

In one embodiment, the second communication interface 1201 is further configured to:

subsequent to sending the first request to the UDR network element, send a second request to the UDR network element; where, the second request represents a subscription request for the restart event of the UDR network element.

In an embodiment, the second request carries a URI configured to receive a notification message in the UDM network element.

In one embodiment, the second communication interface 1201 is further configured to:

subsequent to receiving the first message sent by the UDR network element, send the first message to an Access and Mobility Management Function (AMF) network element and/or a Session Management Function (SMF) network element.

It should be noted that the specific processing procedures of the second processor 1202 and the second communication interface 1201 can be understood with reference to the above method.

Of course, in actual application, various components in the UDM network element 1200 are coupled together through the bus system 1204. It will be appreciated that bus system 1204 is configured to enable connected communications between these components. In addition to the data bus, the bus system 1204 also includes a power bus, a control bus and a status signal bus. However, for the sake of clarity, the various buses are labeled bus system 1204 in FIG. 13.

The second memory 1203 in the embodiment of the present disclosure is configured to store various types of data to support the operation of the UDM network element 1200. Examples of such data include: any computer program configured to operate on UDM network element 1200.

The methods disclosed in the above embodiments of the present disclosure can be applied to the second processor 1202 or implemented by the second processor 1202. The second processor 1202 may be an integrated circuit chip with signal processing capabilities. During the implementation process, each step of the above method can be completed by instructions in the form of hardware integrated logic circuits or software in the second processor 1202. The above-mentioned second processor 1202 may be a general-purpose processor, a DSP, or other programmable logic devices, discrete gate or transistor logic devices, discrete hardware components, etc. The second processor 1202 can implement or execute the various methods, steps, and logical block diagrams disclosed in the embodiments of the present disclosure. A general-purpose processor may be a microprocessor or any conventional processor, etc. The steps of the method disclosed in the embodiments of the present disclosure can be directly implemented by a hardware decoding processor, or executed by a combination of hardware and software modules in the decoding processor. The software module may be located in a storage medium, and the storage medium is located in the second memory 1203. The second processor 1202 reads the information in the second memory 1203, and completes the steps of the foregoing method in combination with its hardware.

In an exemplary embodiment, the UDM network element 1200 may be implemented by one or more ASICs, DSPs, PLDs, CPLDs, FPGAs, general processors, controllers, MCUs, Microprocessors, or other electronic components for performing the foregoing method.

It can be understood that the memory (first memory 1103, second memory 1203) in the embodiment of the present disclosure may be a volatile memory or a non-volatile memory, or may include both volatile and non-volatile memory. Among them, non-volatile memory can be Read Only Memory (ROM), programmable read-only memory (PROM), erasable programmable read-only memory (EPROM)., Electrically Erasable Programmable Read-Only Memory (EEPROM), ferromagnetic random access memory (FRAM,), Flash Memory, Magnetic Surface Memory, optical disk, or CD-ROM (Compact Disc Read-Only Memory); the magnetic surface memory can be a magnetic disk memory or a tape memory. Volatile memory can be random access memory (RAM), which is used as an external cache. By way of illustration, but not limitation, many forms of RAM are available, such as Static Random Access Memory (SRAM), Synchronous Static Random Access Memory (SSRAM), Dynamic Random Access Memory Memory (DRAM), synchronous dynamic random access memory (SDRAM), double data rate synchronous dynamic random access memory (DDRSDRAM), enhanced Enhanced Synchronous Dynamic Random Access Memory (ESDRAM), SyncLink Dynamic Random Access Memory (SLDRAM), Direct Rambus Random Access Memory (DRRAM). The memories described in the embodiments of the present disclosure are intended to include, but are not limited to, these and any other suitable types of memories.

In an exemplary embodiment, the embodiment of the present disclosure also provides a storage medium, that is, a computer storage medium, specifically a computer-readable storage medium, for example, including a first memory 1103 that stores a computer program. The above computer program can be configured by a UDR network element. The first processor 1102 of 1100 executes to complete the steps described in the aforementioned UDR network element side method. Another example includes a second memory 1203 that stores a computer program. The computer program can be executed by the second processor 1202 of the UDM network element 1200 to complete the steps of the aforementioned UDM network element side method. The computer-readable storage medium may be memory such as FRAM, ROM, PROM, EPROM, EEPROM, Flash Memory, magnetic surface memory, optical disk, or CD-ROM.

It should be noted that "first", "second", etc. are used to distinguish similar objects and are not necessarily used to describe a specific order or sequence.

"and/or" in the present disclosure is just an association relationship that describes related objects, indicating that three relationships can exist. For example, A and/or B can mean: A exists alone, A and B exist simultaneously, and they exist alone. B these three situations. In addition, the term "at least one" in this article means any one of a plurality or any combination of at least two of a plurality, for example, including at least one of A, B, and C, which can mean including from A, Any one or more elements selected from the set composed of B and C.

In addition, the technical solutions described in the embodiments of the present disclosure can be combined arbitrarily as long as there is no conflict.

The above descriptions are only some embodiments of the present disclosure and are not intended to limit the scope of the present disclosure.

What is claimed is:

1. A user data disaster tolerance method, applied to a Unified Data Repository (UDR) network element, comprising:
    after the UDR network element is restarted due to a fault, sending a first message to each Unified Data Management (UDM) network element in a UDM network element set;
    wherein the first message is configured to notify a restart event of the UDR network element;
    wherein prior to the sending the first message to each UDM network element in the UDM network element set, the method further comprises:
    creating first subscription information for the UDM network element;
    wherein the first subscription information represents that the corresponding UDM network element subscribes to the restart event of the UDR network element.

2. The method according to claim 1, wherein the first message carries at least one of:
    a restart time of the UDR network element;
    an impacted number range.

3. The method according to claim 1, wherein the first message is a POST message.

4. The method according to claim 1, wherein the first subscription information at least comprises an identification of the corresponding UDM network element.

5. The method according to claim 1, wherein when creating the first subscription information for the UDM network element, the method comprises:
    creating the first subscription information for the corresponding UDM network element based on a received first request or second request;
    wherein the first request represents an access request for the UDR network element; and
    wherein the second request represents a subscription request for the restart event of the UDR network element.

6. The method according to claim 5, further comprising at least one of the following:
    obtaining a Uniform Resource Identifier (URI) configured to receive a notification message in the UDM network element, by querying a Network Repository Function (NRF) network element; and,
    obtaining a URI configured to receive a notification message in the UDM network element from the first request or the second request of the UDM network element.

7. The method according to claim 1, further comprising:
    backing up the first subscription information corresponding to the UDM network element.

8. The method according to claim 1, wherein subsequent to the sending the first message to each UDM network element in the UDM network element set, the method further comprises:
    performing a data synchronization with at least one of the following: an Access and Mobility Management Function (AMF) network element; and, a Session Management Function (SMF) network element.

9. A user data disaster tolerance method, applied to a Unified Management (UDM) network element, comprising:
    receiving a first message sent by a Unified Data Repository (UDR) network element to each Unified Data Management (UDM) network element in a UDM network element set;
    wherein the first message is configured to notify a restart event of the UDR network element;
    wherein prior to the receiving the first message sent by the UDR network element, the method further comprises:
    sending a first request to the UDR network element;
    wherein the first request represents an access request for the UDR network element; and
    wherein the UDM subscribes to the restart event of the UDR network element.

10. The method according to claim 9, wherein the first message carries at least one of the following:
    a restart time of the UDR network element; and
    an impacted number range.

11. The method according to claim 9, wherein the first message is a POST message.

12. The method according to claim 9, wherein the first request carries a Uniform Resource Identifier (URI) configured to receive a notification message in the UDM network element.

13. The method according to claim 9, wherein subsequent to the sending the first request to the UDR network element, the method further comprises:
    sending a second request to the UDR network element;
    wherein the second request represents a subscription request for the restart event of the UDR network element.

14. The method according to claim 13, wherein the second request carries a URI configured to receive a notification message in the UDM network element.

15. The method according to claim 9, wherein subsequent to the receiving the first message sent by the UDR network element, the method further comprises:
sending the first message to at least one of the following:
an Access and Mobility Management Function (AMF) network element; and,
a Session Management Function (SMF) network element.

16. A Unified Data Repository (UDR) network element, comprising: a first processor and a first memory configured to store a computer program executable on the processor,
wherein the first processor is configured to execute the computer program to perform:
after the UDR network element is restarted due to a fault, sending a first message to each Unified Data Management (UDM) network element in a UDM network element set;
wherein the first message is configured to notify a restart event of the UDR network element;
wherein prior to the sending the first message to each UDM network element in the UDM network element set, the first processor is further configured to execute the computer program to perform:
creating first subscription information for the UDM network element;
wherein the first subscription information represents that the corresponding UDM network element subscribes to the restart event of the UDR network element.

* * * * *